Feb. 21, 1950          C. E. SMITH          2,498,586

CHALK-WRITING BOARD OF MOLDED PLASTIC MATERIAL

Filed March 21, 1947

INVENTOR.
CHARLES E. SMITH
BY
ATTORNEY

Patented Feb. 21, 1950

2,498,586

UNITED STATES PATENT OFFICE 2,498,586

CHALK-WRITING BOARD OF MOLDED PLASTIC MATERIAL

Charles E. Smith, Pittsburgh, Pa.

Application March 21, 1947, Serial No. 736,235

1 Claim. (Cl. 35—66)

This invention relates to slabs of the character referred to in my application Serial No. 684,260, filed July 17, 1946, which are used for writing boards of the blackboard type. The said application describes and claims a writing board that comprises a slab of hardened plastic material, when in a wet condition, being molded to slab form, for use in place of the slate slabs that are commonly employed.

One object of this invention is to provide an improved arrangement of reinforcement for slabs of molded plastic material, that will strengthen them against breaking from shocks and which will be resistant to the penetration of moisture into the slabs.

Figure 1:
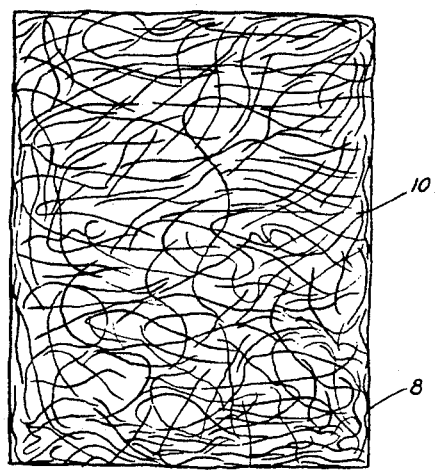
Figure 4:
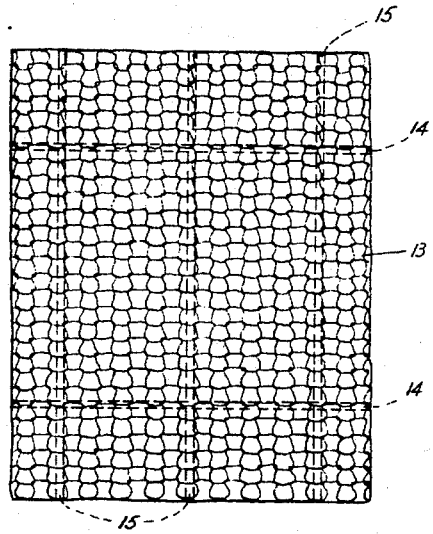
Figure 2:
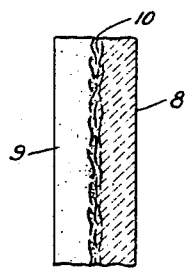
Figure 5:
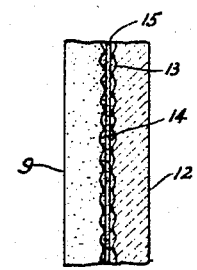
Figure 3:
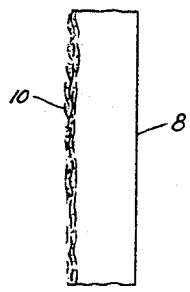
Figure 6:
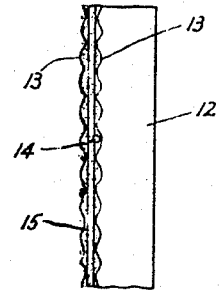

Some of the forms which my invention may take are shown in the accompanying drawings, wherein Figure 1 is a rear view of a slab made according to one form of my invention; Fig. 2 is an edge view thereof, showing the same applied to a permanent wall; Fig. 3 is an edge view of the slab of Fig. 1; Fig. 4 is a rear face view of a slab constructed in another manner by the use of my invention; Fig. 5 is an edge view of the same applied to a wall, and Fig. 6 is an edge view of the slab of Fig. 4.

Referring first to Figs. 1, 2 and 3, the slab may be of one of the compositions recited in my said application, as for example

| | Parts by weight |
|---|---|
| Silicon carbide granules of 220 mesh | 10 |
| Fast-setting Portland cement | 100 |
| Water | 40 |
| Mineral pigments | 5 |

However, I find it desirable to reduce the water content of the mixture and substitute therefor one of the water-soluble resin syrups. For example, the water might be reduced to 20 parts or less and sufficient resin syrup added to give the desired consistency to the mixture, for molding it to slab form. The resin not only reduces the amount of water required and hence the drying shrinkage of the slab, but also increases its density and hardness and reduces the porosity of the slab and renders it more resistant to the absorption of moisture after it has been installed for use. The reduction in porosity also has the effect of increasing the tensile strength and impact resistance of the slab.

The primary feature of my invention resides in the provision of the reinforcement as above. The body of the slab is indicated by the numeral 8 and may be of one of the compositions above referred to. The plastic mixture can suitably be shaped to slab form by placing it in a mold whose floor or bottom wall is quite smooth, so that it will give a smooth but dull finish surface to what becomes the writing face or exposed surface of the slab when it is installed against a wall 9. When the mold has been substantially completely filled to the desired slab thickness, I place thereon a fibrous mat 10 which may be of sisal, palm, cocoa, hemp, hair or glass fibers. The fibers are loosely matted, so that when the mat is pressed against the plastic body, the plastic materials are penetrated into and exude slightly through the interstices between the fibers, the mat being thereby firmly adherent to the plastic body, to reinforce the same and cushion it against shocks during handling and also cushioning it against vibrations after it has been installed on the wall 9. It can be cemented to the wall or attached thereto in some other suitable manner.

Where animal or vegetable fibers are used, it will be advantageous to spray the exposed or partly exposed face of the mat with latex or a liquid resin, after the mat has been placed in adherent and partly embedded relation to the rear face of the slab. The spraying or brushing of latex on the exposed fibers tends to produce a smooth surface and prevent the fibers from protruding raggedly, thus reducing danger of the fibers being torn loose and frayed out during handling of the slab previous to installation thereof on a wall. The latex or resin film also resists penetration of moisture into the slab, from a damp wall or otherwise. When glass fibers are used as the reinforcement, they can be loosely held in matted relation to one another by the use of a resin coating.

The use of loosely matted fibers also give considerable sound-proofing effect to the slab in that it will deaden sounds which are transmitted through the wall from an ajoining room, and they also reduce vibratory noises such as those produced by heavy vehicles passing the building in which the blackboard slabs are installed.

Referring now to Figs. 4, 5 and 6, I show a slab 12 reinforced by two sheets 13 of fine wire cloth between which is placed a wire mesh formed by longitudinal rods 14 welded to transversely-extending wires 15. These wires 14—15 may suitably be $\frac{3}{32}$ of an inch in thickness.

This mat structure is applied to the rear side of the slab while it is in a plastic condition, being pressed thereon with sufficient force to cause the plastic to embed the inner layer of the wire cloth 13 and to completely embed the mesh wires 14—

15, the rear-most layer of the cloth 13 being partly exposed and partly embedded in the plaster. The wire cloth layer 13 may be of a single sheet folded over the mesh wires 14—15, or may be lightly welded thereto at intervals or otherwise held in unitary relation therewith for convenience of handling, until the mat has been incorporated into the rear face of the slab.

This metal reinforcement not only strengthens the slab against breakage, but the exposed bends of the rear sheet of wire cloth also have some cushioning effect, through their contact with the wall 9 to which the slab is applied.

I claim as my invention:

A writing-board comprising a slab of hardened plastic material, a relatively thin mat of loosely matted fibers partly imbedded in the rear face of the slab, and an adherent film that holds the exposed fiber ends against the rear face of the mat.

CHARLES E. SMITH.

REFERENCES CITED

The following references are of record in the file of this patent:

UNITED STATES PATENTS

| Number | Name | Date |
|---|---|---|
| 77,705 | Pelletier | May 5, 1868 |
| 288,145 | Whittemore et al. | Nov. 6, 1883 |
| 288,262 | Rowland | Nov. 13, 1883 |
| 675,238 | Orr | May 28, 1901 |
| 2,168,445 | MacIldowie | Aug. 8, 1939 |
| 2,337,757 | Lewis | Dec. 28, 1943 |

FOREIGN PATENTS

| Number | Country | Date |
|---|---|---|
| 464,303 | Great Britain | Apr. 15, 1937 |